United States Patent [19]

Kolodziej et al.

[11] Patent Number: 5,705,012

[45] Date of Patent: Jan. 6, 1998

[54] METHOD FOR MOLDING PLANAR BILLET OF THERMALLY INSULATIVE MATERIAL INTO PREDETERMINED NON-PLANAR SHAPE

[75] Inventors: Paul Kolodziej, Redwood City; Joe A. Carroll, Chula Vista; Dane Smith, Ceres, all of Calif.

[73] Assignee: The United States of America as represented by the Administrator of the National Aeronautics and Space Administration, Washington, D.C.

[21] Appl. No.: 644,630

[22] Filed: Apr. 22, 1996

[51] Int. Cl.$^6$ ................................................ B29C 43/04
[52] U.S. Cl. ............................................ 156/245; 264/320
[58] Field of Search ............................ 156/245; 264/58, 264/60, 320, 257, 259; 244/158 A

[56] References Cited

U.S. PATENT DOCUMENTS

| | | |
|---|---|---|
| 1,815,992 | 7/1931 | Sherts et al. . |
| 2,219,423 | 10/1940 | Kurtz ........................ 419/61 |
| 2,814,289 | 5/1957 | Dunn . |
| 3,792,139 | 2/1974 | Weinstein .................. 264/58 |
| 3,915,609 | 10/1975 | Robinson . |
| 3,952,083 | 4/1976 | Fletcher et al. ............. 264/60 |
| 4,023,322 | 5/1977 | Hughes ..................... 52/608 |
| 4,448,742 | 5/1984 | Kromrey . |
| 5,084,226 | 1/1992 | Tarlton et al. . |
| 5,226,352 | 7/1993 | Savage . |
| 5,227,176 | 7/1993 | McIntyre-Major . |
| 5,264,061 | 11/1993 | Juskey et al. . |
| 5,330,346 | 7/1994 | Scardovi . |
| 5,385,699 | 1/1995 | Numoto et al. . |
| 5,413,859 | 5/1995 | Black et al. . |

*Primary Examiner*—Richard Crispino
*Attorney, Agent, or Firm*—Kenneth L. Warsh; John G. Mannix; Gary Borda

[57] ABSTRACT

A method and apparatus for molding thermal protection system (TPS) tiles for spacecraft includes a bottom mold member defining a mold surface shaped like a surface of the spacecraft, e.g., the nose cap or wing leading edge, sought to be thermally protected. A flat billet of TPS material is positioned over the periphery of the mold surface, and a hollow weight element that has a periphery configured like the periphery of the mold surface is positioned on the billet. The billet is then heated in accordance with a predetermined heating regime, and during the heating process the weight of the weight element causes the billet to deform to assume the shape of the mold surface. If desired, a TUFI coating is impregnated into the billet prior to heating, and the coating is sintered to the billet during heating. After heating, a composite matrix material, e.g., a graphite or fiberglass cloth which is impregnated with epoxy or polimide, is bonded to the now-shaped tile to support the tile. Silicone can then be impregnated into the now-formed tile to provide flexibility of the tile.

5 Claims, 1 Drawing Sheet

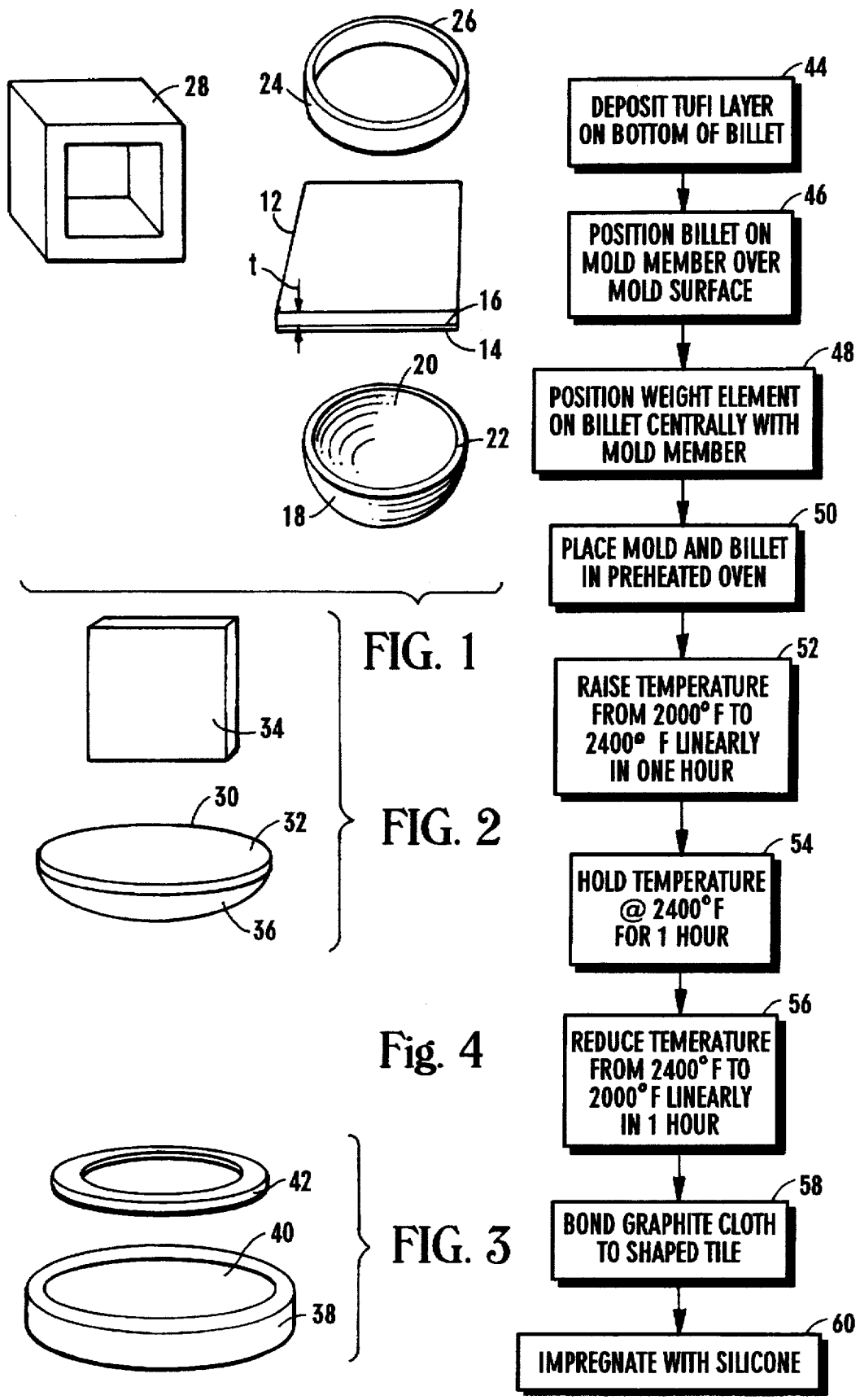

METHOD FOR MOLDING PLANAR BILLET OF THERMALLY INSULATIVE MATERIAL INTO PREDETERMINED NON-PLANAR SHAPE

ORIGIN OF INVENTION

The Invention described herein was made in the performance of work under a NASA contract and is subject to Public Law 96-517 (35 U.S.C. 200 et seq.). The contractor has not elected to retain title of the invention.

BACKGROUND OF THE INVENTION a. Technical Field of the Invention

The present invention relates generally to thermal protection systems for spacecraft during ascent and reentry, and more particularly to methods and apparatus for molding relatively large thermal protection system tiles or panels.

b. Description of the Prior Art

Spacecraft must be protected from frictional heat that is generated when the spacecraft move rapidly through the Earth's atmosphere during ascent and reentry. Accordingly, thermal protection systems (TPS) have been developed to protect spacecraft from high temperatures during the spacecrafts' passage through the atmosphere.

Typical of TPS is the system currently used to protect U.S. space shuttles from heat. Essentially, the TPS used on the shuttle consists of a large number of small, thermally insulative tiles which are bonded to the skin of the shuttle. It will be appreciated that the skin of a spacecraft is not uniformly flat. Consequently, the tiles must be precisely machined both to ensure that the bottom surface of each tile fits flushly against the skin of the spacecraft, and to ensure that the tiles themselves fit closely with adjacent tiles, to minimize heat transfer between joints that are established between adjacent tiles. Because such machining must be precisely performed, it is common to machine TPS tiles by computer-controlled automation.

Unfortunately, making tiles by machining makes it difficult at best to manufacture large tiles. A principal reason is that were a large tile to be bonded to a non-planar surface of a spacecraft, the entire bottom surface of the tile would have to be machined to fit flushly against the non-planar surface. This would necessitate the use of a relatively thick tile to start with, with much of the tile being excised and thus wasted during machining. Stated differently, the billet dimensions required to support such machining would be prohibitively large. Further, the machining process itself would be difficult and cumbersome at best on such a large scale, and would also require comparatively expensive computer controlled milling devices.

Accordingly, existing TPS tiles are small, on the order of 6"×6". It will readily be appreciated that the area of the skin of the shuttle which must be covered by tiles is large, making necessary the use of thousands of small tiles. Unfortunately, the need to manufacture, install, inspect, and replace thousands of tiles per spacecraft is expensive and time consuming. Additionally, the use of thousands of small tiles in turn establishes thousands of tile joints that must be maintained to precise tolerances, any one of which could potentially fail with catastrophic results.

Still further, a TPS tile that is made of fiber-based composites happens to be most thermally insulative when its individual fibers are all oriented parallel to the surface of the tile. Unfortunately, when a tile is machined to conform to a curved surface, e.g., the nose cap or wing leading edge of a spacecraft, the fibers of the tile are not all oriented parallel to the curved surface of the tile, thereby reducing the insulative properties of the tile. Fortunately, the present invention recognizes and overcomes the above-mentioned drawbacks.

Accordingly, it is an object of the present invention to provide a method and apparatus for molding relatively large tiles or panels for spacecraft TPS. Another object of the present invention is to provide a method and apparatus for molding spacecraft TPS tiles to conform to curved, i.e., non-planar, surfaces of the spacecraft. Yet another object of the present invention is to provide a method and apparatus for attaching molded TPS tiles to a composite structure which is easy to use and cost effective.

SUMMARY OF THE INVENTION

An apparatus is disclosed for configuring a planar billet of thermally insulative material to closely conform to a non-planar surface of a spacecraft. The apparatus includes a mold member which is formed with a mold surface configured substantially identically to the non-planar surface of the spacecraft. As intended by the present invention, the mold member defines a periphery, and the periphery is characterized by a contour. A weight element defines a periphery having a contour substantially identical to the contour of the mold member, with the periphery of the weight element, however, preferably being smaller than the periphery of the mold member. In accordance with the present invention, the billet can be sandwiched between the weight element and the mold member such that the weight of the weight element urges the billet toward the mold surface to cause the billet to assume the conformation of the mold surface when the billet is heated.

In one embodiment, the mold surface is concave, but it is to be understood that the mold surface can be convex. Preferably, the weight element is hollow. Indeed, in one presently preferred embodiment, the mold surface defines a portion of a sphere and the weight element is configured as a ring, so as to cause the billet to assume the shape of a nose cap of the spacecraft. Alternatively, the mold surface defines an oval-shaped trough and the weight element is configured as a square, so as to cause the billet to assume the shape of a wing leading edge of the spacecraft.

Per the present invention, the mold member and weight element are made of materials having substantially the same coefficient of thermal expansion as the coefficient of thermal expansion of the billet of thermally insulative material. Desirably, the apparatus can further include a furnace for enclosing the mold member and weight element and heating the billet to a predetermined temperature range for a predetermined time period.

An insulative material can be impregnated into the billet prior to the heating step. During heating, the layer is sintered to the billet. Further, the apparatus can include the molded billet itself, and can further include a composite structure, e.g., a graphite cloth, that is bonded to the billet after molding.

In another aspect of the present invention, a method for molding a planar billet of thermally insulative material into a predetermined non-planar shape includes providing a mold member formed with a mold surface. The mold surface has the predetermined non-planar shape, and the mold member defines a periphery. The method additionally includes providing a weight element that defines a periphery shaped as the periphery of the mold member and marginally smaller than the periphery of the mold member.

Per the present method, the planar billet is sandwiched between the weight element and the mold member above the mold surface, such that the weight of the weight element urges the planar billet toward the mold surface. The billet is heated to a predetermined temperature range for a predetermined period, and as it is heated the billet assumes the shape of the mold surface.

In still another aspect of the present invention, a system for molding a thermally insulative tile for covering a non-planar surface of a spacecraft includes a billet made of thermally insulative material. Moreover, the system includes a mold member which has a mold surface positioned beneath the billet, and the mold surface is characterized by the shape of the non-planar surface of the spacecraft. A weight element is positioned on the billet and configured to urge the billet toward the mold surface under the influence of gravity. As contemplated herein, a furnace is in thermal communication with the billet for heating the billet to cause the billet to assume the shape of the mold surface.

The details of the present invention, both as to its construction and operation, can best be appreciated in reference to the accompanying drawings, in which like reference numerals refer to like parts, and in which:

BRIEF DESCRIPTION OF THE DRAWINGS

FIG. 1 is an exploded perspective view of the TPS tile molding system of the present invention;

FIG. 2 is a perspective view of a thermally insulative non-planar tile made in accordance with the present invention;

FIG. 3 is an exploded perspective view of an alternate embodiment of the mold member and weight element of the present invention; and FIG. 4 is a flow chart showing the operational steps of the present invention.

DETAILED DESCRIPTION OF THE INVENTION

Referring initially to FIG. 1, a system is shown, generally designated 10, for molding a flat, parellelepiped-shaped billet 12 into a predetermined non-planar shape for covering a non-planar surface of a spacecraft to thermally insulate the non-planar surface during ascent and reentry. Accordingly, in one presently preferred embodiment the billet 12 is made of fibrous spacecraft thermal protection system (TPS) material. More specifically, the billet 12 can be made of any one of the silica fiber-based or alumina fiber-based materials disclosed in U.S. Pat. No. 3,952,083 and colloquially referred to as, for example, "FRCI", "AETB", "HTP".

In the embodiment shown in FIG. 1, the billet 12 is to be molded into a portion of a sphere to cover the nose cap of a spacecraft, and accordingly the billet 12 is a ten inch by ten inch (10"×10") square having a thickness "t" of about one quarter of an inch (¼"). It is to be understood, however, that the particular dimensions of the billet 12 are established depending on the particular shape of the mold and the intended TPS application as more fully disclosed below.

The billet 12 defines a bottom side 16 and a top side 17. If desired, a fibrous insulation material 14 can be impregnated into the top side 17 of the billet 12 (i.e., the side of the billet 12 that faces upwardly during the molding process discussed below). In one presently preferred embodiment, the material 14 can be the material referred to as "toughened uni-piece fibrous insulation" ("TUFI"), although other suitable materials may be used. During the heating process discussed herein, the layer 14 is sintered into the top side 17 of the billet 12.

FIG. 1 shows that a mold member 18 is formed with a mold surface 20 that is configured substantially identically to the non-planar surface of the spacecraft sought to be protected. In the specific embodiment shown, the mold surface 20 is non-planar and is convex, although it can be concave in some embodiments. Indeed, when the tile to be molded is intended to cover a round surface, e.g., the nose cap of a spacecraft, the mold surface 20 defines a portion of a sphere, as shown in FIG. 1. It is to be understood that in any case, the mold surface 20 is curved, and the curvature of the mold surface 20 can be in two dimensions (as shown in FIG. 1) or one dimension (as shown in FIG. 3 and discussed further below).

Preferably, the mold member 18 is made of a rigid, hard material that has a high melting point. Advantageously, the mold member 18 is made of one of the fibrous TPS materials disclosed above. Alternatively, the mold member 18 can be made of Fusil® foam made by Hatbison-Walker Refractories of Calhoun, Ga. In either case, the skilled artisan will recognize from the above disclosure that the mold member 18 preferably is made of a high purity silica material that has substantially the same low coefficient of thermal expansion that characterizes the material of the billet 12. With this structure, molding the billet 12 into precisely the desired shape is facilitated, and the risk of contaminating the billet 12 with impurities is reduced.

FIG. 1 further shows that the mold member 18 defines a periphery 22 having a contour, which contour is circular in the embodiment shown. The diameter of the periphery 22 is marginally smaller than the distance between opposed edges of the billet 12, such that the billet 12 can be positioned on the periphery 22 and very slightly overlap the periphery 22. It will be appreciated in reference to FIG. 1 that when the billet 12 is properly positioned on the periphery 22, the billet 12 is positioned above the mold surface 20, with the bottom surface 16 of the billet 12 facing the mold surface 20 and closely spaced therefrom.

Additionally, the system 10 includes a weight element 24. In one presently preferred embodiment, the weight element 24 is hollow. As shown, the weight element 24 defines a periphery 26 which has a contour that is substantially identical to the contour of the periphery 22 of the mold member 18. Although substantially identical in contour to the mold member 18, however, the periphery 26 of the weight element 24 preferably is slightly smaller than the periphery 22 of the mold member 18. Thus, when the mold surface 20 establishes a portion of a sphere and the contour of the periphery 22 consequently is circular as shown in FIG. 1, the weight element 24 is shaped as a ring having a diameter slightly smaller than the diameter of the periphery 22 of the mold member 18. Like the mold member 18, the weight element 24 is made of a material that has substantially the same coefficient of thermal expansion as the coefficient of thermal expansion of the billet 12.

In continued reference to FIG. 1, the billet 12 is sandwiched between the weight element 24 and the mold member 18 such that the weight of the weight element 24 urges the billet 12 toward the mold surface 20. The combination of mold and billet 12 is then placed in an industrial furnace 28 to heat the billet 12 to a predetermined temperature range for a predetermined time. In accordance with the present invention, during the heating process the weight of the weight element 24 on the billet 12 causes the billet 12 to assume the conformation of the mold surface 20.

FIG. 2 shows that when the mold surface 20 establishes a portion of a sphere, the billet 12 is rendered into a rigid panel or tile 30 which is characterized by a non-planar, partially spherical configuration suitable for flushly positioning a concave inner surface 32 of the panel or tile 30 onto, e.g., the nose cap of a spacecraft. If desired, after forming the panel or tile 30 from the billet 12, a composite material, such as a fiberglass or graphite cloth 34 that is impregnated with a suitable adhesive matrix, e.g., epoxy or polimide, is positioned flat against the inner surface 32 of the panel or tile 30 and bonded thereto to provide structural support for the panel or tile 30. Moreover, an outer convex surface 36 of the panel or tile 30 can be impregnated with silicone 37 using, e.g., the so-called Silicone Impregnated Reusable Ceramic Ablator (SIRCA) (patent pending) developed at the NASA Ames Research Center at Moffett Field, Calif.

The present invention can be used to mold insulative tiles in configurations other than that shown in FIG. 2. For example, the present invention can be used to mold tiles that are curved in one dimension and consequently that are configured for covering the leading edge of a wing of a space shuttle. FIG. 3 shows that to produce such tiles, a mold member 38 is formed with a mold surface 40 defining an oval-shaped trough, and a weight element 42 is configured as a hollow rectangular ring.

FIG. 4 shows the method steps of molding the billet 12 shown in FIG. 1 into the non-planar panel or tile 30 shown in FIG. 2. Starting at block 44, the top surface 17 of the billet 12 can be impregnated with the material 14 of fibrous insulative material by means well-known in the art.

Next, at block 46, the billet 12 is positioned on the mold member 18 over the mold surface 20, and at block 48 the weight element 24 is positioned on the billet 12, with the peripheries 22, 26 of the mold member 18 and weight element 24 being generally coaxial with each other and the billet 12 sandwiched therebetween. Then, at block 50 the mold member 18, weight element 24, and billet 12 are placed in the furnace 28.

Preferably, the furnace 28 is preheated to about two thousand degrees Fahrenheit (2000° F.) prior to placing the billet 12 in the furnace 28. After the billet 12 has been placed in the furnace 28, the temperature inside the furnace 28 is linearly raised over the course of an hour from 2000° F. to about 2400° F. at block 52.

After attaining a temperature of about 2400° F., the temperature is held substantially constant at 2400° F. for about an hour, as indicated at block 54. Then, at block 56 the temperature is linearly lowered over the course of an hour from 2400° F. to about 2000° F.

During the heating of the billet 12, the weight of the weight element 24 presses the billet 12 toward the mold surface 20. As we have discovered, owing to the high temperature at which it is heated and its particular material characteristics, the billet 12 deforms to the smooth shape of the mold surface 20, i.e., the shape of the panel or tile 30, without requiring machining. Also, the fibrous material 14 is sintered to the billet 12 during the heating steps of blocks 52–56. This is advantageous, because not infrequently, when such sintering is otherwise performed outside a mold, unwanted deformation can result because of mismatches between the respective coefficients of thermal expansion of the material 14 and billet 12. As recognized by the present invention, however, such unwanted deformation, apart from the intended deformation to the shape of the panel or tile 30, does not occur when the material 14 is sintered to the billet 12 while the billet 12 is positioned between the weight element 24 and mold member 18.

From block 56, the present method proceeds to block 58, wherein now-formed panel or tile 30 is removed from the furnace 28 and the graphite or fiberglass cloth 34 is impregnated with an adhesive such as epoxy or polyimide and then laid against the inner surface 32 of the panel or tile 30 to bond the cloth 34 to the panel or tile 30. At block 60, the outside surface 36 of the panel or tile 30 is impregnated with silicone using the SIRCA process mentioned above.

While the particular METHOD AND APPARATUS FOR MOLDING SPACECRAFT THERMAL TILES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A method for making a spacecraft thermal protection system tile by molding a planar billet of thermally insulative material into a predetermined non-planar shape, comprising the steps of:

(a) providing a mold member formed with a mold surface having the predetermined non-planar shape, the mold member defining a periphery;

(b) providing a weight element defining a periphery shaped as the periphery of the mold member;

(c) sandwiching the planar billet between the weight element and the mold member above the mold surface, such that the weight of the weight element urges the planar billet toward the mold surface; and (d) heating the billet to a predetermined temperature range for a predetermined period to cause the billet to assume the shape of the mold surface thereby forming said tile.

2. The method of claim 1, wherein the billet is characterized by a first thermal expansion coefficient and the weight element and mold member are characterized by respective second and third thermal expansion coefficients, and the second and third thermal expansion coefficients are substantially equal to the first thermal expansion coefficient.

3. The method of claim 2, further comprising the step of impregnating the billet with a fibrous material prior to the heating step.

4. The method of claim 3, further comprising the step of bonding a composite matrix material to the billet after the heating step.

5. The method of claim 3, wherein the predetermined temperature range is between about two thousand degrees Fahrenheit and twenty four hundred degrees Fahrenheit (2000° F.–2400° F.) and the predetermined period is between about one hour and three hours.

* * * * *